United States Patent [19]

Kanai

[11] Patent Number: 5,566,355
[45] Date of Patent: Oct. 15, 1996

[54] RADIO LINK CONTROL METHOD FOR A MOBILE TELECOMMUNICATIONS SYSTEM

[75] Inventor: Toshihito Kanai, Tokyo, Japan

[73] Assignee: NEC Corporation, Tokyo, Japan

[21] Appl. No.: 355,011

[22] Filed: Dec. 13, 1994

[30] Foreign Application Priority Data

Dec. 14, 1993 [JP] Japan ................................... 5-312966

[51] Int. Cl.⁶ ....................................................... H04B 7/14
[52] U.S. Cl. ........................... 445/25; 455/33.3; 455/56.1; 342/432
[58] Field of Search .......................... 455/25, 33.3, 33.2, 455/33.1, 56.1, 33.4, 34.1, 34.2, 54.1, 7, 9, 63, 67.1, 67.3, 129; 342/383, 384, 432

[56] References Cited

U.S. PATENT DOCUMENTS

| | | | |
|---|---|---|---|
| 4,638,318 | 1/1987 | Gutleber | 342/383 |
| 4,881,082 | 11/1989 | Graziano | 342/432 |
| 5,010,343 | 4/1991 | Andersson | 342/432 |
| 5,134,715 | 7/1992 | Parl et al. | 455/64 |

FOREIGN PATENT DOCUMENTS

| | | |
|---|---|---|
| 62-92630 | 4/1987 | Japan . |
| 4-320122 | 11/1992 | Japan . |

OTHER PUBLICATIONS

T. Ohgane, "Improving Frequency Utilization Radio by . . . Directivity of Cellular Base Station", Inst. of Elect. Data Comm. Engrs. of Japan, Spring Con., Fascicle No. 2, B–397, pp. 2–398, Apr. 1993.

Christopher R. Ward et al., "A Novel Algorithm and Architecture for Adaptive Digital Beamforming", *IEEE Transactions on Antennas and Propagation*, vol. AP–34, No. 3, Mar. 1986, pp. 338–346.

Simon C. Swales et al., "The Performance Enhancement of Multibeam . . . Antennas for Cellular Systems", *IEEE Transactions on Vehicular Technology*, vol. 39, No. 1, Feb. 1990, pp. 56–67.

Primary Examiner—Andrew Faile
Assistant Examiner—Lee Nguyen
Attorney, Agent, or Firm—Sughrue, Mion, Zinn, Macpeak & Seas

[57] ABSTRACT

In a cellular mobile telecommunications system, a radio link control method provides each base station with an antenna whose directivity is adaptively controllable on a mobile station basis. The base station communicates with a plurality of mobile stations by using the same frequency at the same time. The base station selects, among transmitters/receivers thereof which are in communication, two transmitters/receivers using the same frequency, detects the main beam directions of antenna directivities thereof, and then compares a difference between the main beam directions and a predetermined threshold. If the former is smaller than the latter, the base station executes handover so as to replace the frequency being used by one of the transmitters/receivers with another frequency. The method allows a single base station to use the same frequency twice or more while preventing interference from occurring within the base station.

3 Claims, 5 Drawing Sheets

| | | CHANNEL | | | | | | | | | |
|---|---|---|---|---|---|---|---|---|---|---|---|
| | | 1 | 2 | 3 | 4 | 5 | 6 | 7 | 8 | 9 | 10 |
| ANGULAR VELOCITY | $\omega < -\omega 2$ | O | X | X | X | X | X | X | X | X | X |
| | $-\omega 2 \leq \omega < -\omega 1$ | X | O | O | X | X | X | X | X | X | X |
| | $-\omega 1 \leq \omega < \omega 1$ | X | X | X | O | O | O | O | X | X | X |
| | $\omega 1 \leq \omega < \omega 2$ | X | X | X | X | X | X | X | O | O | X |
| | $\omega 2 < \omega$ | X | X | X | X | X | X | X | X | X | O |

O : USABLE

X : UNUSABLE

FIG. 5

RADIO LINK CONTROL METHOD FOR A MOBILE TELECOMMUNICATIONS SYSTEM

BACKGROUND OF THE INVENTION

1. Field of the Invention

The present invention relates to a cellular mobile telecommunications system and, more particularly, to a radio link control method capable of adaptively controlling the directivity of an antenna of a base station on a mobile station basis and thereby allowing the base station and a plurality of mobile stations to communicate at the same time over channels of the same frequency or nearby frequencies which are apt to interfere with each other.

2. Description of the Related Art

A car telephone system or similar large capacity mobile radio telecommunications system having a plurality of base stations each covering a respective service area is conventional and generally referred to as a cellular telecommunications system. This kind of system allows the same frequency to be repeatedly used between base stations which are free from interference, thereby promoting the effective use of limited frequencies. A cellular telecommunications system is provided with either an omni architecture or a sector architecture, as well known in the art. In the omni architecture, a single non-directional antenna is installed in each base station while, in the sector architecture, a plurality of directional antennas are installed in a single base station. Today, the sector architecture is predominant over the omni architecture since it can reduce the size of a service area, i.e., cell size and can enhance the efficient use of frequencies in space without increasing the number of base stations.

Japanese Patent Laid-Open Publication No. 62-92630, for example, discloses a cellular telecommunications system having the sector configuration and capable of promoting the efficient use of frequencies. In this system, a base station is provided with an antenna having a high front-to-back ratio (ratio of a forward radiation level to a backward radiation level in a directional antenna). Such a base station allows different sector cells thereof to reuse the same frequency.

It has been reported that adaptively controlling directivity in matching relation to the state of a mobile station is advantageous over using a base station antenna having fixed directivity. A method of controlling antenna directivity in a horizontal plane is taught in, for example, a paper entitled "Improving Frequency Utilization Radio by Controlling Antenna Directivity of Cellular Base Station", the Institute of Electronic Data Communication Engineers of Japan, Spring Convention, Fascicle No. 2, B-397, page 2-398, Apr. 1993. The method taught in this paper uses a base station antenna implemented as a circular adaptive array of eight antenna elements. The eight elements each has the feed point thereof adaptively controlled, so that a null point is directed to an interference station. With this kind of method, it is possible to reduce the number of repetitive cells to one. Further, Japanese Patent Laid-Open Publication No. 4-320122 proposes a method of controlling antenna directivity in a vertical plane. This system controls the feed phase of each antenna element constituting a base station antenna, thereby tilting a main beam direction. As a result, the ratio of a received level to an interference level is maximized to reduce interference. This is a promising approach to reduce the repetition distance of the same frequency.

The first-mentioned scheme uses a base station having fixed antenna directivity and uses the same frequency twice or more in a single base station. The second and third schemes provide each base station with an antenna adaptively controllable on a mobile station basis, thereby reducing the distance between base stations which can use the same frequency. These conventional schemes readily suggest, in combination, that a base station antenna having directivity adaptively controllable on a mobile station basis may be used to reduce the distance between base stations which can share the same frequency, while allowing each base station to use the same frequency twice or more. However, when the base station having an antenna whose directivity is adaptively controllable uses the same frequency or nearby frequencies twice or more, interference is apt to occur within the base station even if the base station is free from interference as confirmed at the beginning of communication. As mobile stations communicating with the base station by use of the same frequency or nearby frequencies approach each other with respect to the direction to the base station, antenna directivities using the same frequency or nearby frequencies overlap each other and cause interference to occur.

SUMMARY OF THE INVENTION

It is, therefore, an object of the present invention to provide a radio link control method for a cellular mobile telecommunications system which uses a base station antenna whose directivity is adaptively controllable on a mobile station basis, allows a single base station to use the same frequency twice or more, and in addition prevents interference from occurring within the base station during communication.

In accordance with the present invention, in a mobile telecommunications system having a plurality of base stations each being situated at a respective radio zone, and a plurality of mobile stations capable of communicating with the base stations, the base stations each communicating, by use of an antenna which adaptively sets up particular antenna directivity for each mobile station, with two or more of the mobile stations at the same time by using frequencies which are apt to interfere with each other, a radio link control method consists in detecting a main beam direction of antenna directivity set up on a mobile station basis, and switching, when a difference in angle between the main beam directions of two antenna directivities using frequencies which are apt to interfere with each other at the same time decreases to below a predetermined value, the mobile station using one of the two antenna directivities to a channel of a frequency which is free from interference.

Also, in accordance with the present invention, in a mobile telecommunications system of the type described, a radio link control method consists in detecting, in the event of assigning a channel to one of the base stations which requests a communication, a difference in angle between a main beam direction of antenna directivity for the base station requesting a communication and a main beam direction of antenna directivity for each of the other mobile stations communicating at the same time by using frequencies which are apt to interfere with the above-mentioned channel, and allowing the base station requesting a communication to use the channel if the difference is larger than a predetermined value.

Further, in accordance with the present invention, in a mobile telecommunications system of the type described, a radio link control method consists in detecting angular velocity of main beam directions of antenna directivities for the mobile stations in communication, and switching channels such that the mobile stations indicating the same degree of angular velocity use frequencies apt to interfere with each other at the same time.

BRIEF DESCRIPTION OF THE DRAWINGS

The prevent invention will be described in further detail with reference to the accompanying drawings in which.

DESCRIPTION OF THE PREFERRED EMBODIMENTS

Figure 1:
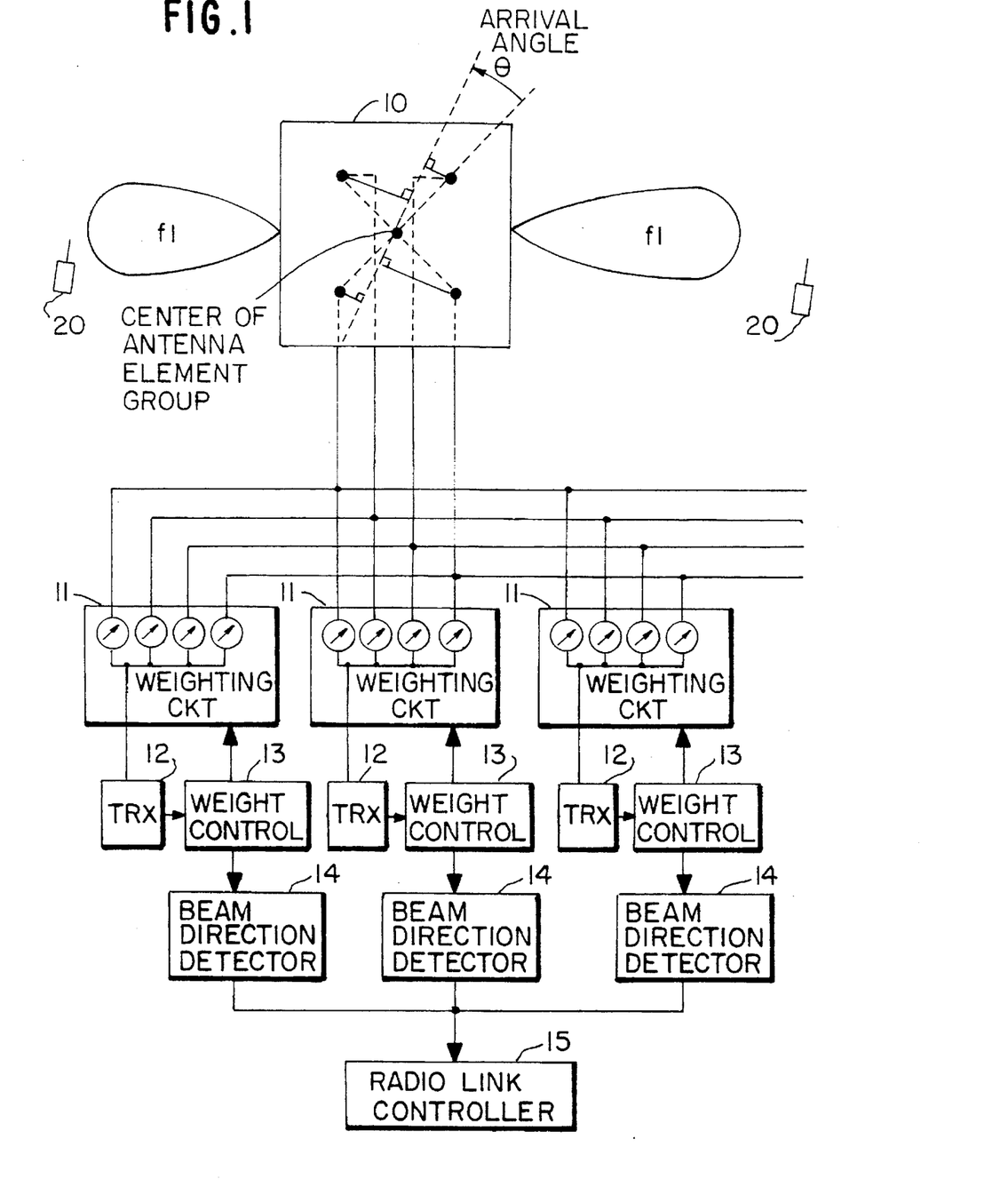
FIG. 1 is a block diagram schematically showing the basic construction of a base station with which the present invention is practicable.

Referring to FIG. 1 of the drawings, a base station is shown with which a radio link control method of the present invention is practicable. As shown, the base station has an antenna 10 made up of four antenna elements. Weighting circuits 11 allow the directivity of the antenna 10 to be changed on a channel basis. Transceivers (TRXs) 12 are each connected to one of the weighting circuits 11 and one of weight control sections 13 associated therewith. 10 Each weight control section 13 compute an optimal weight which maximizes a desired wave-to-interference wave power ratio (CIR) received from a mobile station 20. The weight from the weight control section 13 is fed to the weighting circuit 11 and a beam direction detector 14. In response, the detector 14 computes antenna directivity based on the weight and thereby determines the direction of a main beam. A radio link controller 15 performs channel assignment and channel switchover, taking account of the outputs of such detectors 14.

To determine an optimal weight, the weight control sections 13 may use a procedure taught in, for example, IEEE Trans. Antenna and Propagation, Special Issue on Adaptive Processing Antennas Systems, Vol. AP-34, No. 3, Mar. 1986. When use is made of an antenna capable of synthesizing directivities so as to maximize CIR on a mobile station basis, as stated above, a single base station can use the same frequency (f1) at the same time, as illustrated in FIG. 1.

The beam direction detectors 14 detect the directions of main beams, as follows. Assume that each of the antenna elements of the antenna 10 is non-directional in a horizontal plane for simplicity. Also, assume that the four antenna elements are respectively provided with weights w1–w4 and with phase differences $p1(\theta)$–$p4(\theta)$ relative to the center of the antenna element group with respect to a plane wave arriving in a direction $\theta$. Then, the synthesized antenna directivity is expressed as $\Sigma w_i \cdot pi(\theta)(i=1-4)$. $\theta$ which gives the maximum amplitude of this function is regarded as the direction of a main beam. On the other hand, when each of the antenna elements is directional in a horizontal plane, $\theta$ which maximizes the amplitude of $\Sigma gi(\theta) \cdot w_i \cdot pi(\Sigma)(i=1-4)$, where $gi(\Sigma)$ is the respective directivity characteristic, is regarded as the direction of a main beam.

Figure 2:
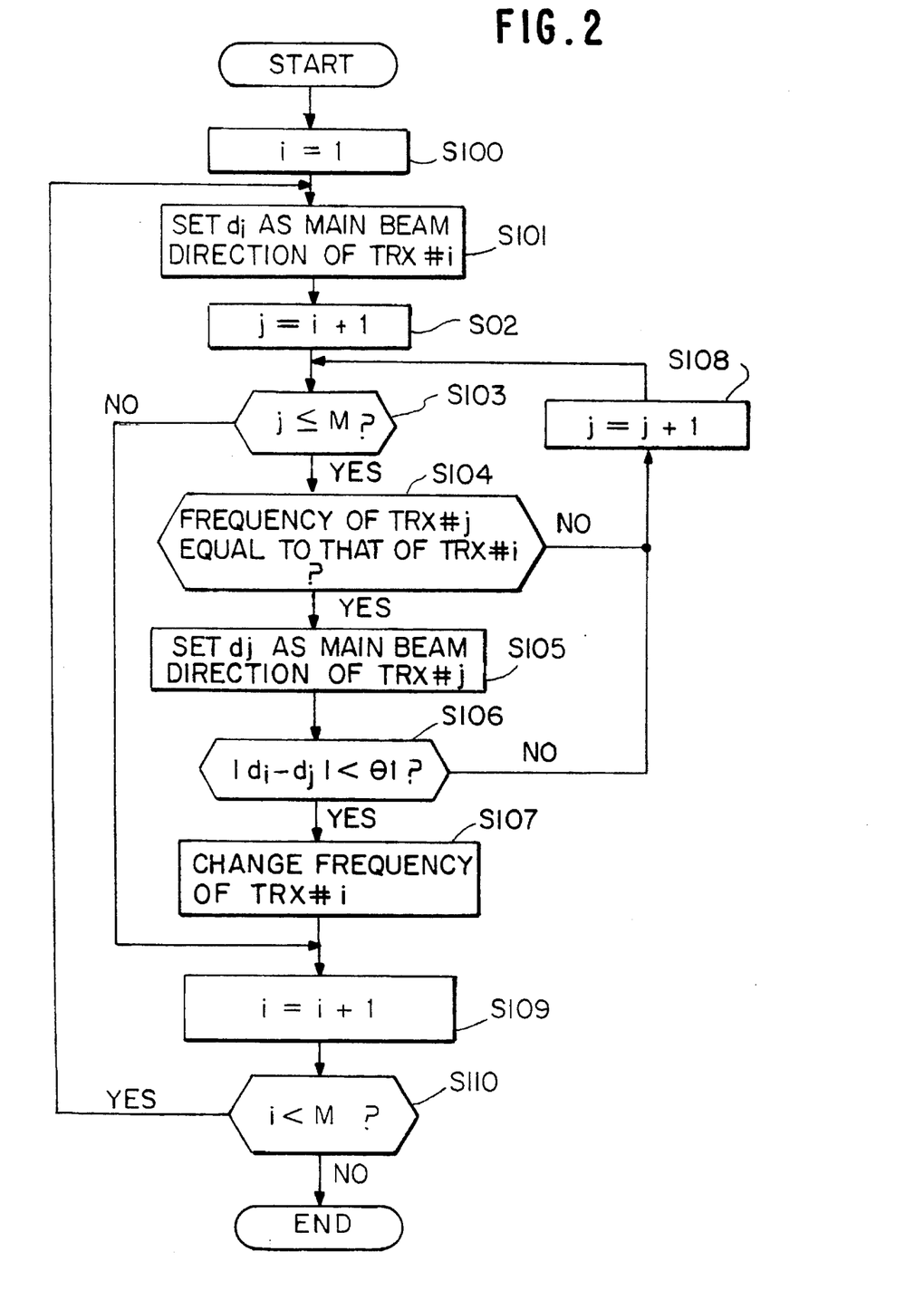
FIGS. 2 and 3 are flowcharts respectively representing a first and a second embodiment of the radio channel control method in accordance with the present invention.

FIG. 2 is a flowchart representing the operation of a base station to which a first embodiment of the present invention is applied. Briefly, when a plurality of mobile stations use a single frequency at the same time within a service area assigned to the base station, the procedure shown in the figure prevents antenna beams from the mobile stations from overlapping each other despite the movement of the mobile stations. Assume that the number of TRXs 12 of the base station which are in communication is M.

When the base station starts operating, it sets "1" as a number 1 which identifies a TRX selected (step S100). Then, the base station reads the main beam direction of TRX #i selected out of the associated beam direction detector 14 and stores it as di (step S101). Subsequently, the base station sets a number j greater than the number i by 1 (one) and indicative of a TRX to be compared with TRX selected previously (step S102), and compares the number j with the number M of TRXs in communication (step S103). If the number j is smaller than or equal to the number M, the base station determines whether or not the two TRXs #i and #j are using the same frequency at the same time (step S104). If they are using the same frequency (YES, step S104), the base station reads the main beam direction of TRX #j out of the associated beam direction detector 14 and stores it as dj (step S105). The base station compares the absolute value of a difference between di and dj with a preselected threshold $\theta 1$ (step S106). If the absolute value is smaller than the threshold $\theta 1$ (YES, step S106), meaning that interference is apt to occur, the base station switches over the frequency of the mobile station using TRX #i to another frequency (step S107). If TRXs #i and #j are not using the same frequency (NO, step S104) or if the absolute value is greater than $\theta 1$ (NO, step S106), meaning that interference is not apt to occur, the base station increments the number j by 1 (step S108) so as to select the next TRX to be compared. Thereafter, the base station repeats the sequence of steps S103–S107.

When the number j is greater than the number M (NO, step S103) or when the frequency of the mobile station using TRX #i is switched over to another frequency (step S107), the base station increments the number 1 by 1 (step S109) and then compares the resulting number i with the number M (step S110). If the number i is smaller than the number M (YES, step S110), the program returns to the step S101 for repeating the steps S101–S109 with the next TRX #i. If the number i is greater than the number M (NO, step S110), the base station completes the processing operation.

In the above procedure, only the TRX using the same frequency as the TRX selected at the same time is detected. Alternatively, when not only the same frequency but also adjoining frequencies are apt to cause interference, as in an interleave arrangement, the procedure described above may be executed by detecting a TRX using an adjoining frequency.

Figure 3:
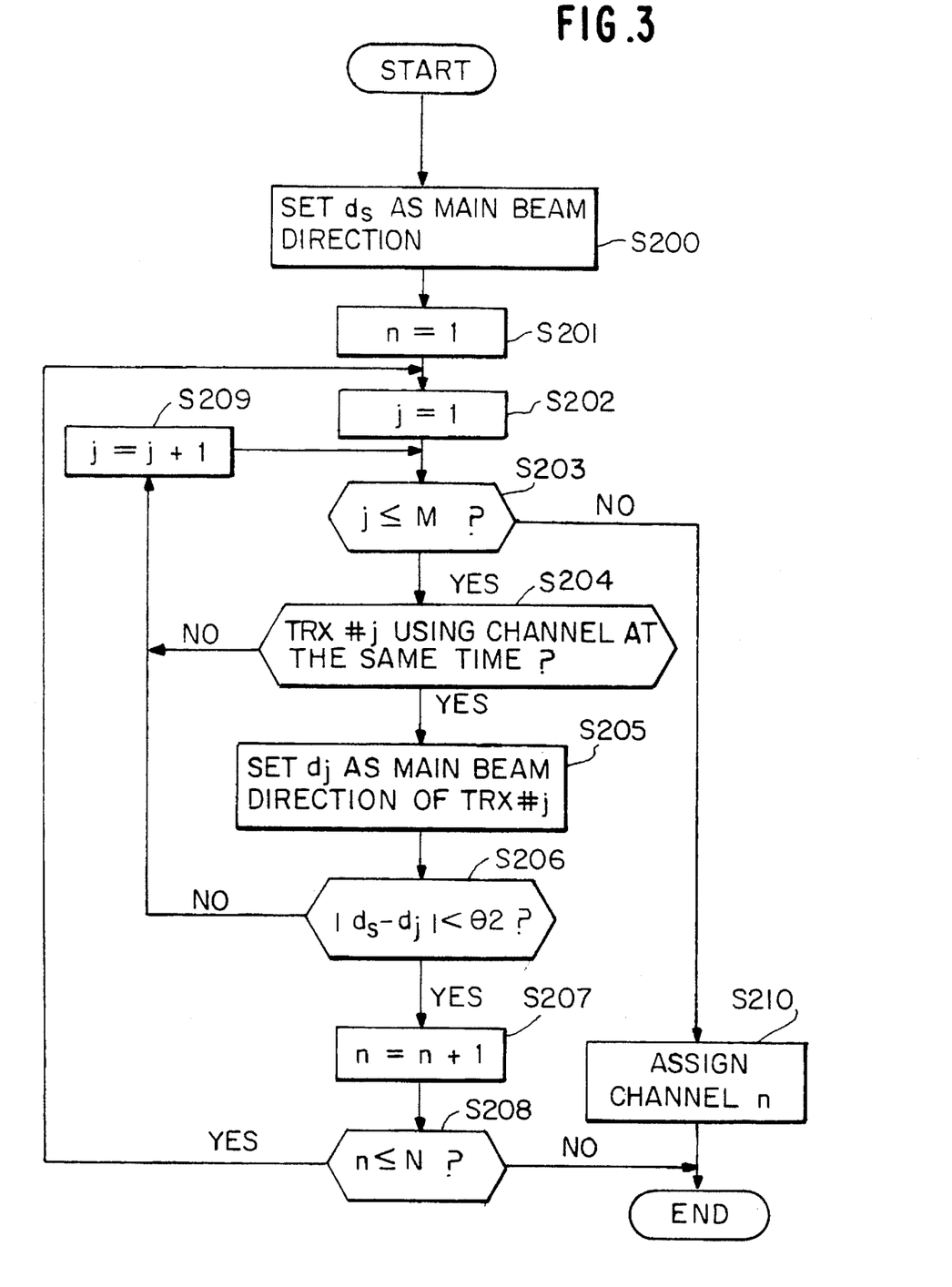

Referring to FIG. 3, the operation of a base station implemented with a second embodiment of the present invention will be described. This embodiment assigns channels such that antenna beams from a plurality of mobile stations, which use the same frequency, do not overlap each other as far as possible. Again, assume that the number of TRXs of the base station which are in communication is M. Also, assume that N channels are available at each base station.

As shown in FIG. 3, on receiving a communication request, the base station detects, on the basis of a signal from a mobile station received on a control channel, a main beam direction associated with the mobile station requesting a communication and stores it as ds (step S200). Next, the base station sets "1" as a number n which identifies a channel (step S201), sets "1" as the number j indicative of a TRX to be compared (step S202), and then compares the number j with the number M of TRXs currently in communication (step S203). If the number j is smaller than or equal to M (YES, step S203), the base station determines whether or not TRX #j is using the channel n at the same time (step S204). If the answer of the step S204 is YES, the base station reads the main beam direction of TRX #j out of the associated beam direction detector 14 and stores it as dj (step S205). Subsequently, the base station compares the absolute value of a difference between ds and dj and a preselected threshold θ2 (step S206). If the former is smaller than the latter (YES, step S206), the base station determines that the new channel n will probably cause interference to occur, abandons the assignment of the channel n, and increments the number n by 1 (step S207). The base station compares the resulting number n with the number of channels N which it can use (step S208). If the channel number n is smaller than or equal to N, (YES, step S208), the base station repeats the step S202 and successive steps with the new channel n. If the channel number n is greater than N (NO, step S208), the base station ends the control, determining that no channels 10 are available (loss connection).

If TRX #j is not using the channel n at the same time (NO, step S204) or if the absolute value of the difference between ds and dj is greater than the threshold θ2 (NO, step S206), the base station determines that interference is least probable, increments the number j by 1 (step S209), and then repeats the steps S203–S206 with the next TRX to be compared. When the number j exceeds the number M (NO, step S203), the base station determines that the new channel n will probably not cause interference to occur, assigns the channel n to the communication request (step S210), and then ends the processing.

In the step S204, FIG. 3, only a TRX using the channel n at the same time is detected. Alternatively, when not only the same frequency but also nearby frequencies are apt to cause interference, as in an interleave arrangement, even TRXs using frequencies adjoining the channel n may be detected and controlled in the same manner as described above.

Figure 4:
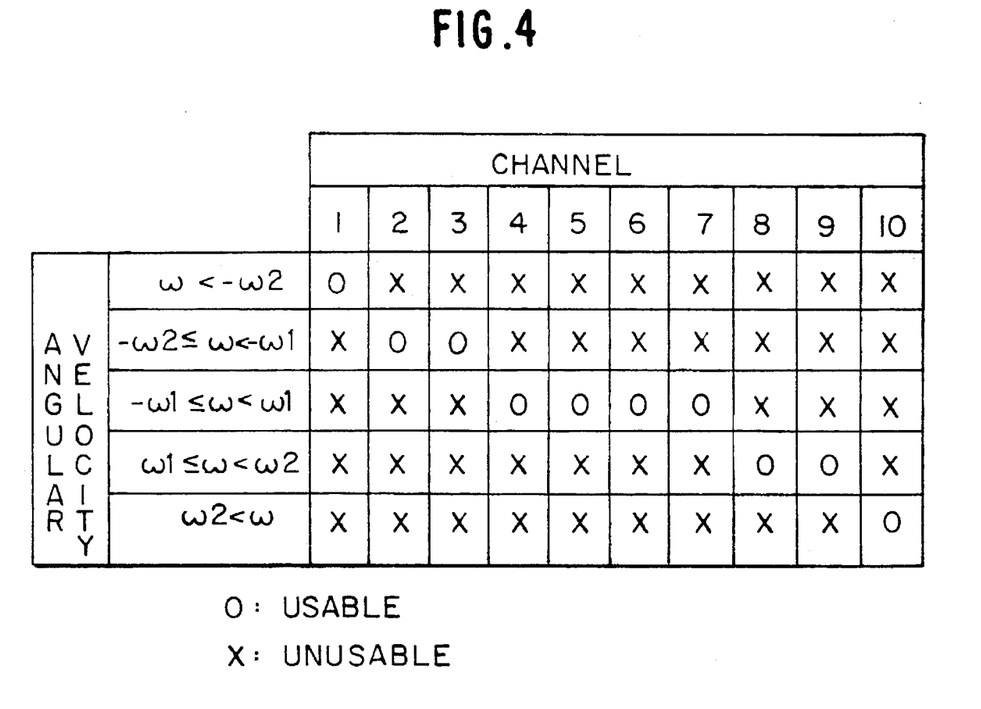
FIG. 4 is a table listing angular velocities of a mobile station to a base station which are assigned to specific channels in accordance with a third embodiment of the present invention.

FIG. 4 lists the angular velocities of a mobile station to a base station which are available on respective channels in accordance with a third embodiment of the present invention. As shown, ten channels 1–10 are assumed to be available. When the angular velocity ω of a mobile station to a base station is less than $-\omega 2$, channel 1 is used. When the angular velocity ω lies in a range of $-\omega 2 \leq \omega < -\omega 1$, channels 2 and 3 are assigned. When the angular velocity ω lies in a range of $-\omega \leq \omega < \omega 1$, channels 4–7 are assigned. When the angular velocity ω lies in a range of $\omega 1 \leq \omega < \omega 2$, channels 8 and 9 are assigned. Further, when the angular velocity ω is higher than ω2, channel 10 is assigned.

Figure 5:
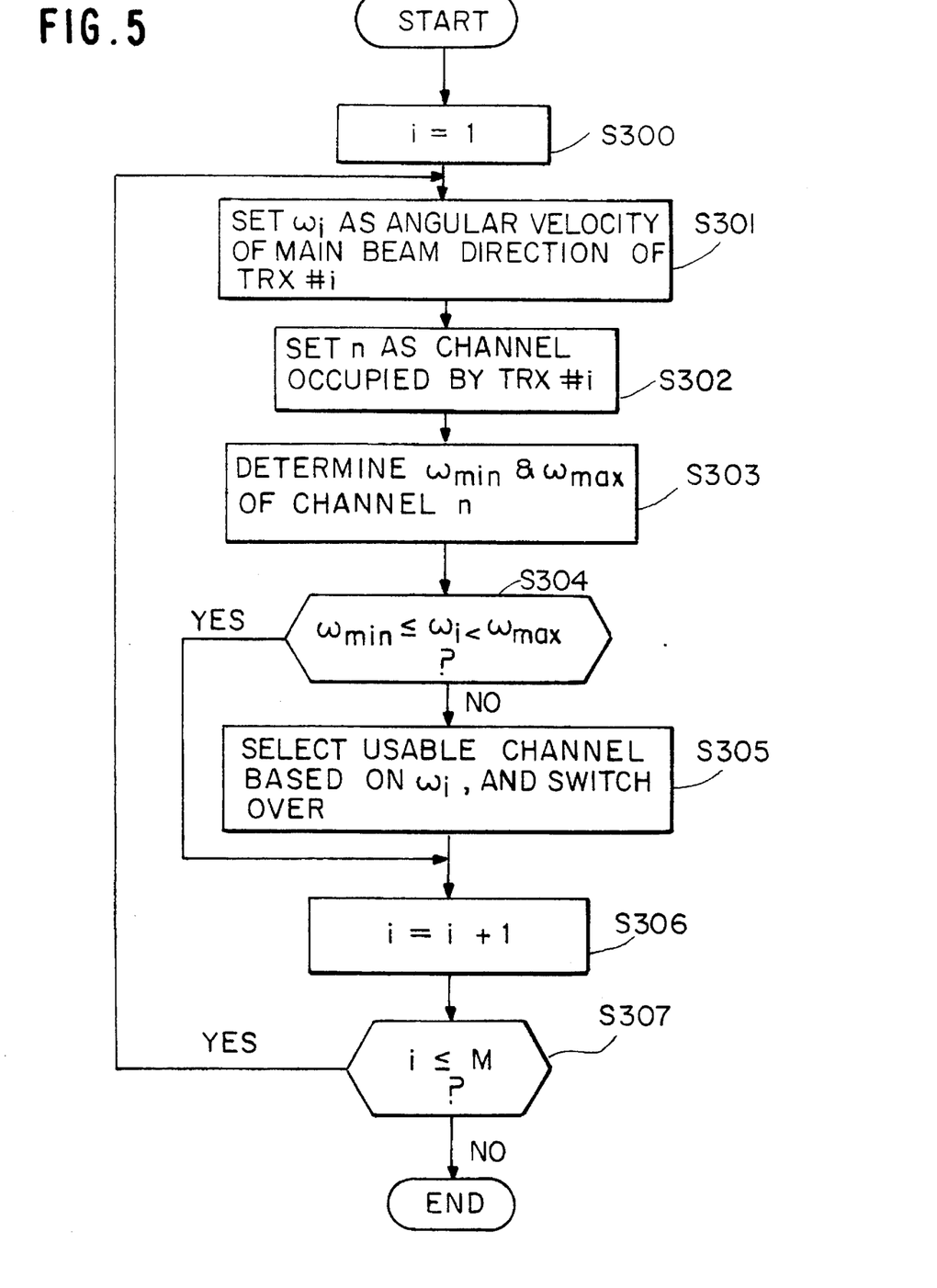
FIG. 5 is a flowchart demonstrating the operation of the third embodiment.

Referring to FIG. 5, the operation of a base station implemented by the third embodiment is shown. Briefly, the third embodiment switches over the channels such that a plurality of mobile stations having substantially the same angular velocity to the base station use the same frequency in the same base station at the same time. This successfully prevents antenna beams from overlapping during communication due to the movement of the mobile stations. Again, assume that M TRXs are communicating at the base station.

When the base station starts operating, it sets "1" as the number i which identifies a TRX in operation and selected (step S300). Subsequently, the base station calculates, based on the transition of the main beam direction of TRX #i read out of the associated beam direction detector 14, an angular velocity of the mobile station to the base station and stores it as ωi (step S301). Then, the base station determines the channel being used by TRX #i selected and stores it as n (step S302), references the table of FIG. 4 to determine the maximum and minimum angular velocities assigned to the channel n, and stores them as ωmin and ωmax, respectively (step S303). The base station determines whether or not the angular velocity ωi of TRX #i lies in the range of $\omega min \leq \omega i < \omega i < \omega max$ (step S304). If it is lower than min or higher than max (NO, step S304), the base station switches over the channel on the basis of the table of FIG. 4, determining that interference is likely to occur (step S305).

After the channel switchover (step S305), or if the angular velocity ωi is higher than ωmin and lower than ωmax (YES, step S304), the base station increments the number i by 1 (step S306) and then compares the resulting number i with M (step S307). If i is smaller than or equal to M (YES, step S307), the base station repeats the steps S301–S306 with TRX #i newly selected. When i exceeds M, the base station completes the processing operation.

It is to be noted that when not only the same frequency but also nearby frequencies are apt to cause interference to occur, as in an interleave arrangement, the allowable angular velocities of the individual channels may be so preselected as to reduce the differences in angular velocity between the channels of nearby frequencies as far as possible. This will successfully reduce the number of times of interference.

The three embodiments shown and described may be practiced either independently or in combination. When two or all of them are used in combination, interference is further reduced. As a result, the same frequency can be used a greater number of times in a single base station, thereby enhancing the efficient use of frequencies in a mobile telecommunications system.

In summary, when a difference between two mobile stations, using frequencies which are apt to interfere with each other at the same time, decreases to below a predetermined value in terms of the angle of main beam direction of antenna directivity from a base station, a first embodiment of the present invention switches one of the two channels. A second embodiment assigns to a mobile station requesting a communication a channel whose frequency will not interfere with another mobile station in communication and lying in a predetermined angular difference range with respect to the main beam direction of antenna directivity for the former station. A third embodiment assigns channels whose frequencies are apt to interfere with each other to mobile stations in communication and of the same degree of angular velocity of the main beam direction of antenna directivity. Hence, in a mobile telecommunications system using a base station antenna whose directivity is adaptively controllable on a mobile station basis and causing a single base station to use frequencies apt to interfere with each other twice or more, the embodiments can each prevent interference from occurring in the same base station during communication. Further, by combining two or all of the embodiments, it is possible to eliminate interference between mobile stations and use the same frequency a greater number of times in the same base station, thereby enhancing the efficient use of frequencies available with the system.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included herein.

What is claimed is:

1. A radio link control method for a mobile telecommunications system comprising:
 a plurality of base stations each being situated at a respective radio zone, and
 a plurality of mobile stations capable of communicating with said plurality of base stations, said plurality of base stations each communicating, by use of an antenna which adaptively sets up particular antenna directivity for each of said plurality of mobile stations, with two or more of said plurality of mobile stations at the same time by using frequencies which are apt to interfere with each other, said method comprising the step of:
 detecting each main beam direction of antenna directivity set up on a communicating mobile station; and
 switching, when a difference in angle between any two main beam directions detected for mobile stations using respective channel frequencies which are apt to interfere with each other at the same time decreases to below a predetermined value, the channel frequency being used by one of said mobile stations to a different channel frequency which is free from interference.

2. A radio link control method for a mobile telecommunications system comprising:
 a plurality of base stations each being situated at a respective radio zone, and
 a plurality of mobile stations capable of communicating with said plurality of base stations, said plurality of base stations each communicating, by use of an antenna which adaptively sets up particular antenna directivity for each of said plurality of mobile stations, with two or more of said plurality of mobile stations at the same time by using frequencies which are apt to interfere with each other, said method comprising the step of:
 detecting, in the event of channel allocation for a mobile station requesting a communication, a difference in angle between a main beam direction of antenna directivity for said mobile station requesting the communication and a main beam direction of antenna directivity for each of the other mobile stations currently communicating using respective channel frequencies which are apt to interfere with a channel frequency to be assigned to said mobile station requesting the communication; and
 allowing assignment of said channel frequency to said mobile station requesting the communication if said difference in angle is larger than a predetermined value.

3. A radio link control method for a mobile telecommunications system comprising a plurality of base stations each being situated at a respective radio zone, and a plurality of mobile stations capable of communicating with said plurality of base stations, said plurality of base stations each communicating, by use of an antenna which adaptively sets up particular antenna directivity for each of said plurality of mobile stations, with two or more of said plurality of mobile stations at the same time by using frequencies which are apt to interfere with each other, said method comprising the steps of:
 detecting angular velocity of main beam directions of antenna directivities for the mobile stations in communication, and switching channels such that the mobile stations indicating a same degree of angular velocity use frequencies apt to interfere with each other at the same time.

* * * * *

UNITED STATES PATENT AND TRADEMARK OFFICE
CERTIFICATE OF CORRECTION

PATENT NO. : 5,566,355
DATED : October 15, 1996
INVENTOR(S) : Toshihito Kanai

It is certified that error appears in the above-indentified patent and that said Letters Patent is hereby corrected as shown below:

Column 3, line 33, delete "10".

Column 3, line 65, delete "($\Sigma$)" and insert -- ($\Theta$) --.

Column 3, line 66, delete "($\Sigma$)" and insert -- ($\Theta$) --.

Signed and Sealed this

Twenty-eighth Day of January, 1997

Attest:

BRUCE LEHMAN

Attesting Officer    Commissioner of Patents and Trademarks